United States Patent [19]

Doyle et al.

[11] Patent Number: 5,414,810
[45] Date of Patent: May 9, 1995

[54] METHOD AND APPARATUS FOR MAINTAINING DATA INTEGRITY WHEN DISPLAYING MULTIPLE DIALOG WINDOWS

[75] Inventors: Mary T. Doyle, Shankill; Jacqueline Kane, Beaumont, both of Ireland

[73] Assignee: International Business Machines Corporation, Armonk, N.Y.

[21] Appl. No.: 200,816

[22] Filed: Feb. 22, 1994

Related U.S. Application Data

[63] Continuation of Ser. No. 724,086, Jul. 1, 1991, abandoned.

[30] Foreign Application Priority Data

Jun. 28, 1990 [EP] European Pat. Off. ......... 90307114

[51] Int. Cl.⁶ .................................... G06F 3/00
[52] U.S. Cl. ...................... 395/157; 395/161
[58] Field of Search ................. 375/155–161, 375/118–120; 395/155–161; 345/117–120

[56] References Cited

U.S. PATENT DOCUMENTS

| | | | |
|---|---|---|---|
| 4,648,062 | 3/1987 | Johnson et al. | 395/155 |
| 4,649,499 | 3/1987 | Sutton et al. | 395/155 X |
| 4,763,356 | 8/1988 | Day, Jr. et al. | 340/712 X |
| 4,772,882 | 9/1988 | Mical | 395/156 |
| 4,819,189 | 4/1989 | Kikuchi et al. | 395/158 |
| 4,823,283 | 4/1989 | Diehm et al. | 395/156 |
| 4,901,221 | 2/1990 | Kodosky et al. | 395/159 |
| 4,931,783 | 1/1990 | Atkinson | 395/156 |
| 4,954,818 | 9/1990 | Nakane et al. | 395/158 |
| 5,091,866 | 2/1992 | Takagi | 395/158 |
| 5,119,476 | 6/1992 | Texier | 395/157 |
| 5,157,768 | 10/1992 | Hoeber et al. | 395/157 |
| 5,179,655 | 1/1993 | Noguchi et al. | 395/158 |

OTHER PUBLICATIONS

Advanced Interface Design Guide, IBM, Jun. 1989, pp. 26, 40–41, 55–58, 60, 63–75, 77–81, 83–87, 121–123.
Macintosh System Software User's Guide, V.6.0, Apple Corp., 1988, pp. 14–43, 148–150.
HyperCard User's Guide, Apple Computer, Inc., 1988, pp. 1–161, 185–195.
Schmandt et al., "Phonetool: Integrating Telephones and Workstations", GlobeCOM'89, Nov. 89, pp. 27.3.1–3.5.
Zellweger et al., "An Overview of the Etherphone System and its Applications", IEEE Comput. Soc. Press, 1988, pp. 160–168.

Primary Examiner—Mark R. Powell
Assistant Examiner—John E. Breene
Attorney, Agent, or Firm—Tim Cook

[57] ABSTRACT

In a data processing apparatus having a windowing user interface a user may manipulate data using dialog boxes. If the user requests the creation of more than one dialog box then the system checks to see if a dialog box for the active logically defined division within the application has already been raised and whether the request for the second dialog box would if granted allow the user to interfere with data integrity. If the system determines that data integrity could be jeopardized by creating the second dialog box then the request is refused. The freedom of action of the user is only restricted to the extent needed to protect data integrity. The system links dialog boxes and other items within a given logically defined division of an application together in a chain structure and allows a user to switch focus between them using cursor keys thereby clearly visually indicating the relationship between them.

27 Claims, 5 Drawing Sheets

METHOD AND APPARATUS FOR MAINTAINING DATA INTEGRITY WHEN DISPLAYING MULTIPLE DIALOG WINDOWS

This application is a continuation of Ser. No. 07/724,086 filed Jul. 1, 1991, now abandoned.

FIELD OF THE INVENTION

This invention relates to the field of data processing. More particularly, this invention relates to the field of user interfaces for data processing apparatus.

BACKGROUND OF THE INVENTION

The user interface of a piece of data processing apparatus is a term that is used to describe the way that apparatus interacts with its user. A particularly important part of a user interface is the way the apparatus displays information the user of the device. Considerable attention is directed at this aspect of user interfaces, and one approach that has been successfully adopted is the so called 'windowing interface'.

In a windowing system such as that used in the Operating System/2 computer program produced by International Business Machines Corporation (Operating System/2 is a trade mark of International Business Machines Corporation), the display is divided into a number of rectangular areas each displaying a piece of text or graphics as appropriate. The windows can be compared to pieces of paper on a desk top, with each window capable of overlapping and obscuring windows having a lower priority in the display. More recent windows systems also provide multiprocessing facilities with which several application programs may be concurrently active. A window may be dedicated to a particular application such as word processing or spreadsheet or alternatively to different threads within a single application, e.g. a window may be allocated to each different part of a word processing application such as pagination, printing, spell checking and the like—different activities on different documents can be controlled concurrently through each window.

One feature of these windowing systems is the provision of so called dialog boxes using which data relating to a preceding action can be entered. An example of this would be if a window displayed a list of names and telephone numbers, a possible action for selection would be to edit the details of an entry. The user would highlight the entry concerned in the list names and then select the action of edit from the list of actions. Having done this the system would display a dialog box possibly overlapping a portion of the window containing the names list. The dialog box would display the full details of that entry, and then by moving around and over typing portions the entry can be edited.

Dialog boxes in existing systems fall into two categories. The is first is modeless dialog boxes, which are such that when they are produced they can be completed at any time, and any other action can be taken in another window whilst the dialog box is still displayed. The second is modal dialog boxes, which come in two forms. System modal dialog boxes are such that when produced no other action may be made by the user until that system modal dialog box has been completed and removed. Application modal dialog boxes are such that when produced no action may be made by the user within the application to which that dialog box belongs until the dialog box has been completed and removed.

The present invention is concerned with the problem of producing data processing apparatus with a user interface that is easier to understand and work with.

Viewed from one aspect the invention provides a method of manipulating data stored by a data processing apparatus having a windowing user interface comprising the steps of:

detecting a user input requesting display for manipulation of data within a logically defined division of an application program executing on said data processing apparatus, creating a dialog window displaying said data for manipulation, storing mode data indicating said dialog window within said logically defined division is being displayed, and upon a subsequent request to manipulate data within a given logically defined division, rejecting said subsequent request if said mode data indicates a dialog window for said logically defined division is being displayed and said subsequent request is determined to be of a type capable of conflicting with manipulation being made using said dialog window being displayed.

The invention both recognizes and solves the problem that while ensuring data integrity within an application is maintained it is important not to excessively restrict the different actions a user may wish to undertake with the data processing apparatus.

The modeless dialog boxes allow the user complete freedom to undertake other actions with the system, but suffer from the disadvantage of not protecting the user from taking actions which disrupt data integrity, e.g. the user can have open a dialog box for editing an entry in data database, while at the same deleting that entry in the database using another part of the application.

The modal dialog boxes, either application or system modal, do protect the user from producing integrity problems, but suffer from the disadvantage of restricting the users freedom more than is truly necessary.

The invention provides a mechanism that is responsive to whether or not a dialog box within a part of an application is already open and whether the further request is capable of creating a data integrity problem with that change being made in the dialog box already open. Thus, data integrity is protected while the restriction of actions possible is held to only a part of the application and also to only requests that could cause data integrity problems.

An example would be a database application for manipulating a list of peoples' telephone numbers or a list of books. The type of actions you may wish to take against each of these lists would be edit an item, add an item, delete an item or sort the list. The list of users and books are quite separate and so would be defined to be within different logically defined divisions of the program—changes to either list wouldn't effect the integrity of the other.

Within a given list if it is decided to edit the details of a particular user then the user is selected from the list of users and the edit action selected from the list of actions thereby triggering production of an edit dialog box for that user. Once that dialog box was open then the other actions which pose a threat to data integrity would be blocked until the editing had been finished and the edit dialog box removed.

A preferred feature of the invention is that said mode data of said dialog window stores an identifier to said logically defined division, said logically defined division identifier being used for directing movement of a cursor between said dialog window and said logically defined division to switch activity therebetween. This feature allows the user to move between the dialog window and other parts of the logically defined division thereby giving a clear visual indication of the link between them. This is particularly useful when more than one dialog box is displayed, each relating to a different logically defined division of the application. In such circumstance each logically defined division could have a number of dialog boxes associated with it each being independently movable. The display could become jumbled and the user may become confused as to which elements of the display relate to one another. By providing a mechanism for rapidly moving focus (i.e. cursor and active status) by preferably using repeated operation of a single key on a keyboard the link between the items is made clear and rapid movement between them is possible.

In preferred embodiments of the invention if said subsequent request does not conflict then a subsequent dialog window is created for said logically defined division and any further subsequent request is tested for conflict with all manipulations being made using dialog windows within that logically defined division. This feature allows more than one dialog box to be created within a logically division to aid the flexibility of the system and yet still protects data integrity. An example would be if the edit telephone number list dialog window included an option of displaying STD (national dialing) codes within another dialog window. This option would be allowed to be activated as no conflict in integrity could arise.

In preferred embodiments of the invention said mode data for each dialog box provides an identifier to one or more other dialog windows of said logically defined division, said dialog window identifier being used for directing movement of a cursor between dialog windows within said logically defined division to switch activity therebetween. The dialog windows within a logically defined division may be thought of as forming a chain of dialog windows between which the user can move to manipulate data within that logically defined division. The provision of this pointer enables the application to move between dialog windows in response to a single command, such as use of the cursor keys. The movement between dialog boxes can be considered as equivalent to movement between links in a chain.

A further preferred feature of the invention is that said logically defined division stores an identifier to a main application action menu, said main application menu identifier being used for directing movement of a cursor between said logically defined division and said main application action menu to switch activity therebetween. In this way the complete chain of all dialog windows for a given logically defined division, the root action menu for the given logically defined division and the main application action menu can be quickly moved between and a clear visual indication of their hierarchical relationship given.

Viewed from a second aspect the invention provides a data processing apparatus having a display, a windowing user interface and dialog box control logic for: detecting a user input from a user input device requesting display for manipulation of data within a logically defined division of an application program executing on said data processing apparatus, creating a dialog window displaying said data for manipulation, storing mode data indicating said dialog window within said logically defined division is being displayed, and upon a subsequent request to manipulate data within a given logically defined division, rejecting said subsequent request if said mode data indicates a dialog window for said logically defined division is being displayed and said subsequent request is determined to be of a type capable of conflicting with manipulation being made using said dialog window being displayed.

SUMMARY OF THE INVENTION

This invention relates to a data processing apparatus having a windowing user interface wherein a user manipulates data using dialog boxes. A user requesting the creation of more than one dialog box causes the apparatus to check to see if a dialog box for the active logically defined division within the application has already been raised and whether the request for a second dialog box would, if granted, allow the user to interfere with data integrity. If the apparatus determines that data integrity could be jeopardized by creating the second dialog box, the request is refused. The apparatus links dialog boxes and other items within a given logically defined division of an application together in a chain structure and allows a user to switch focus between them using cursor keys.

DETAILED DESCRIPTION

Figure 1:
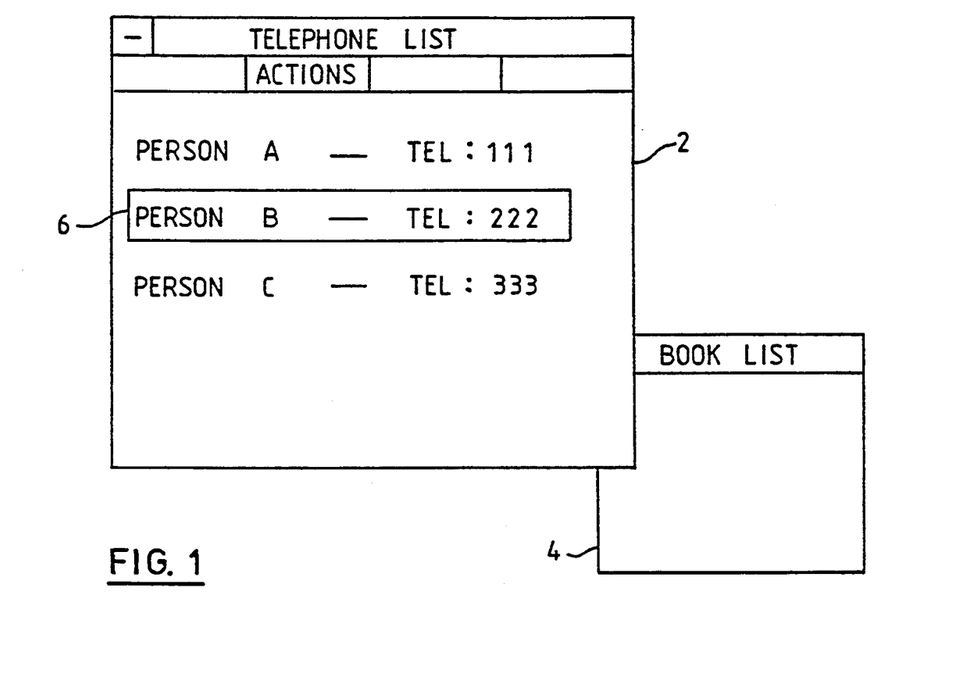
FIG. 1 illustrates a windowing user interface having a plurality of logically defined divisions.

An embodiment of the invention will now be described. FIG. 1 illustrates a database application having a windowing user interface and a number of logically defined divisions within the application program. The program provides access to a list of telephone numbers and peoples names via window 2 and to a list of books via window 4. The telephone list and the book list are separate logically defined divisions within the program since changes in one do not effect the data integrity of the other. In order to carry out a function on one of the items in the telephone list that item is selected by manipulation of the cursor. The selected item 6 is highlighted within the list.

Figure 2:
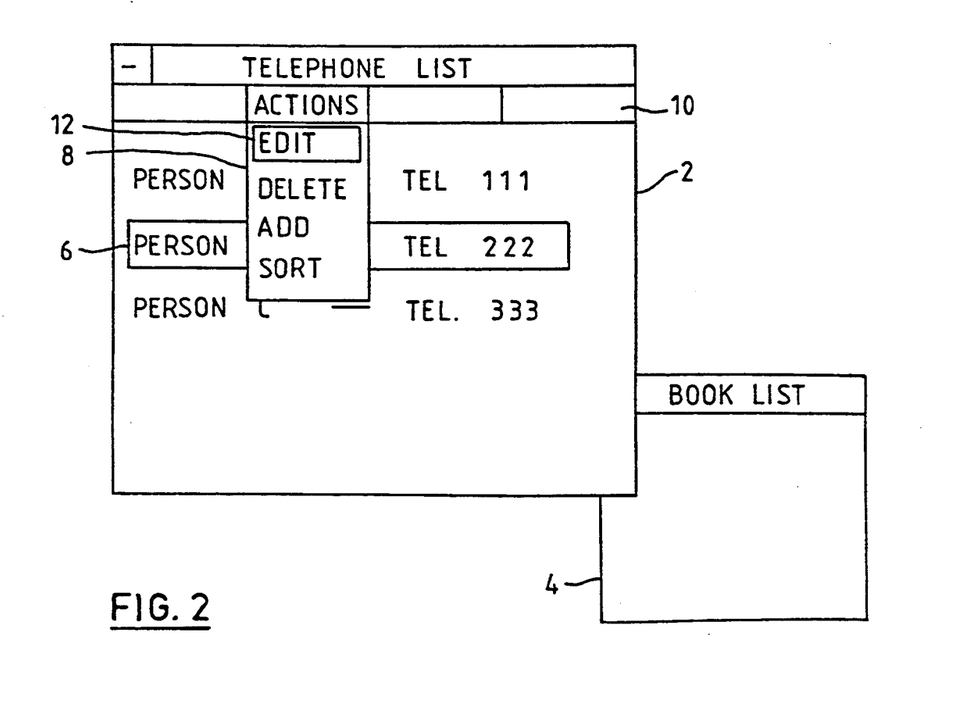
FIG. 2 illustrates the selection of an action within one logically defined division.

FIG. 2 illustrates the next step in the manipulation of the data. A pull down menu 8 from the root action bar menu 10 is selected. The user then highlights a particular action 12 he wishes to perform on the selected item 6.

Figure 3:
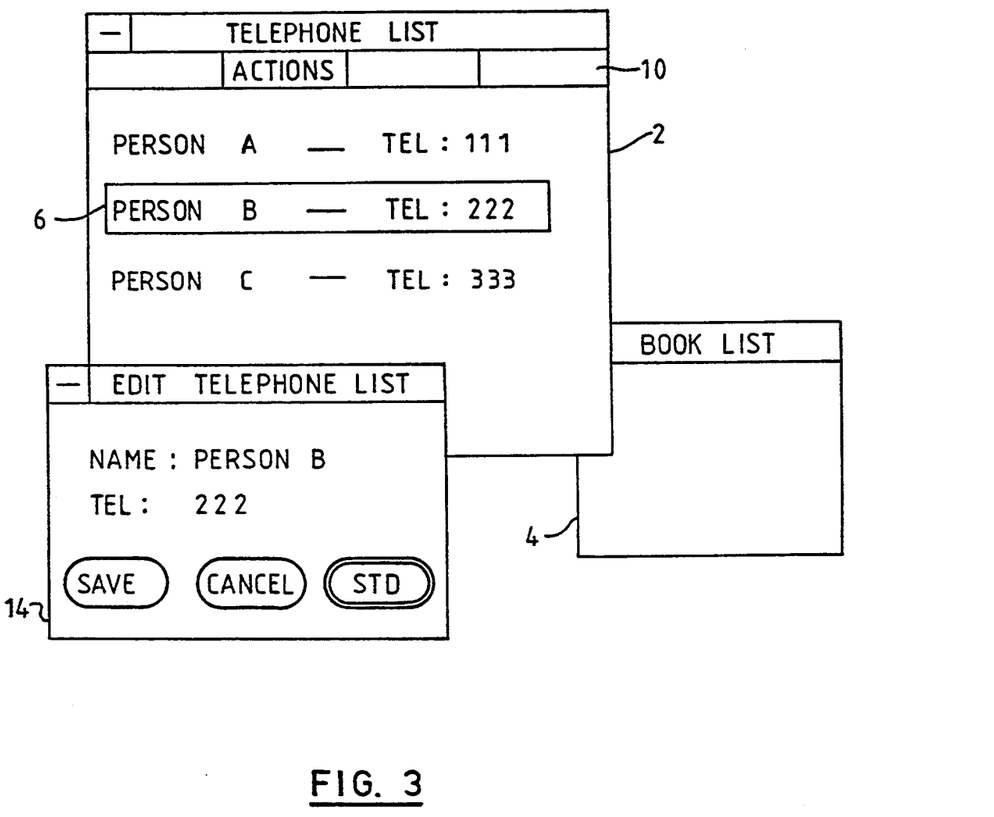
FIG. 3 illustrates a dialog box within one logically defined division.

FIG. 3 illustrates the response to this action selection. The pulled down menu is no longer displayed and an edit telephone list dialog box 14 is created. This edit telephone list dialog box displays details of the selected item 6 which may be edited by the user. When the user has finished with editing the changes can either be saved or discarded using the "Save" or "Cancel" buttons within the dialog box 14. If during the editing of the telephone list the user wishes to refer to a list of STD telephone codes then a second level dialog box 16 can be selected by activating the "STD" button.

Figure 4:
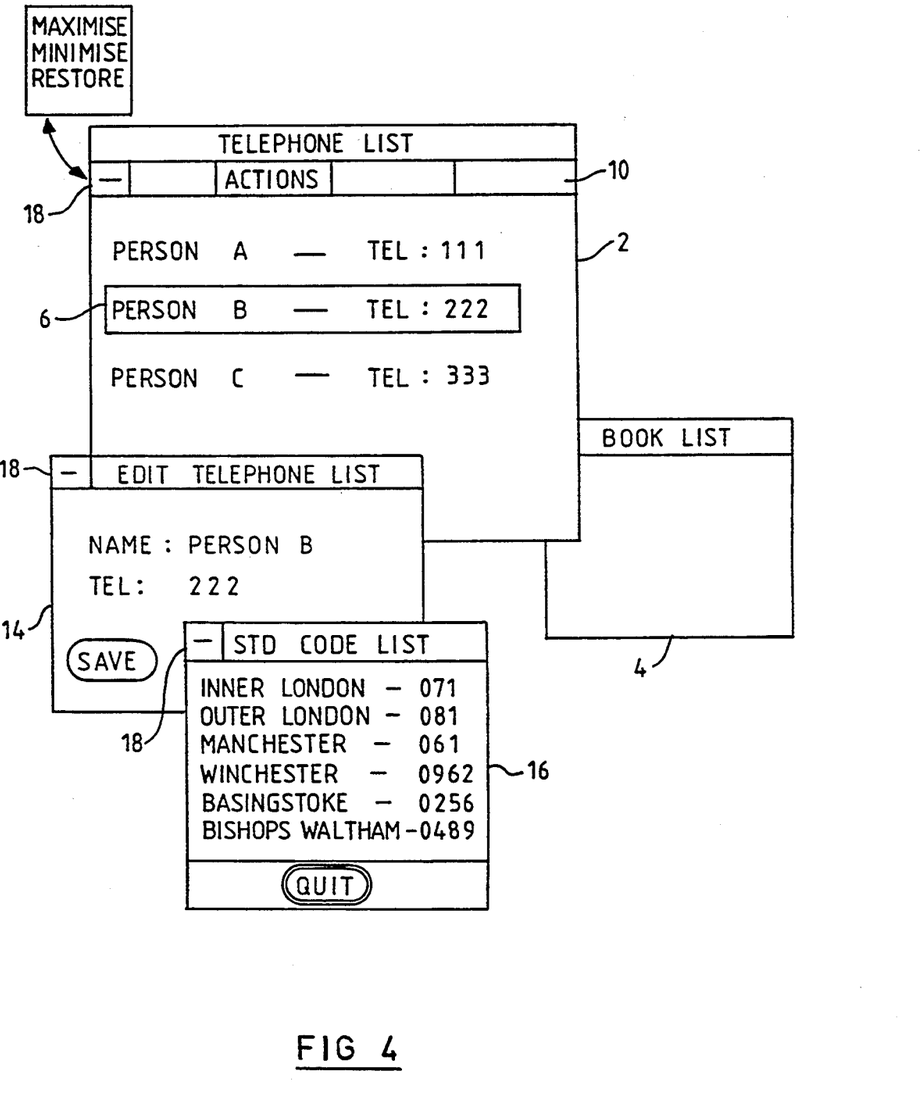
FIG. 4 illustrates a second level dialog box.

FIG. 4 illustrates the display with both first and second level dialog boxes. It will be seen that the display is now becoming complicated. This illustrates why there is a need to protect the user from making changes which could interfere with data integrity. With a large number of different windows being displayed it would be easy for the user to become confused as to which window related to which particular action he wished to make. In order to help the user recognize the link between the various windows a facility is provided for moving between the various portions of a logically defined division. By pressing a particular function key the system moves the focus (i.e. changes which window is active) to the main application menu bar of the logically defined division that is currently active. By manipulating the cursor keys the user may then successively bring the focus to the various other elements within the logically defined division.

The system menu 18 is available on each window and allows the selection of actions which apply to the form of the window itself rather than the function it is performing. When the cursor is moved between the elements within a logically defined division using the function key and cursor keys (chaining process) it is placed on top of the system menu in each window since all windows have a system menu and it is often the system menu functions that are desired to be used. The system menu is initially displayed in the form of a symbol which must be selected to produce the display of the various actions within the system menu.

Figure 5:
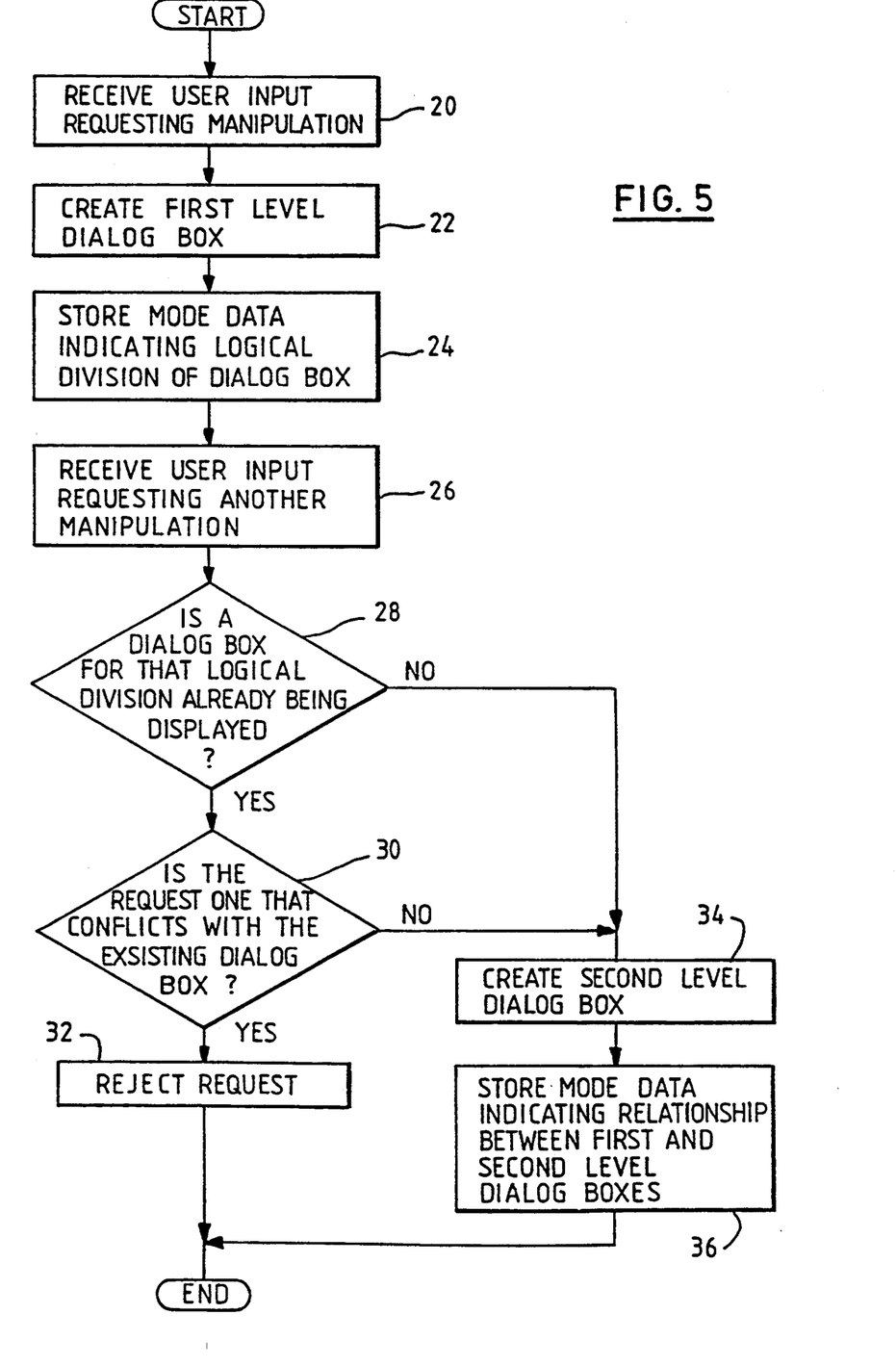
FIG. 5 is a flow diagram illustrating the operation of an embodiment of the invention.

FIG. 5 is a flow diagram illustrating the operation of an embodiment. At step 20 the system receives a user input requesting manipulation, e.g. the user has manipulated the cursor to pick a selected item 6 and a selected action 8. At step 22 the system creates the first level dialog box. At step 24 the system stores the mode data indicating to that dialog box which logical division of the application it belongs to and also indicating to the logical division that a dialog box has been created within it. At step 26 the system receives another user input requesting a further manipulation, e.g. STD code list selection. At step 28 the system reads the stored mode data to determine where a dialog box has already been created for that logical division. At step 30 the system determines whether the subsequent request received at step 26 is one that conflicts with the existing dialog box created at step 22. This test could be performed by comparing the subsequent request with a list of requests that are known to be capable of producing conflicts with the dialog box created at step 22.

If the result for steps 28 and 30 are both YES then at step 32 the request is rejected. If either of the steps 28 and 30 produce a result of NO then at step 34 the system creates the second level dialog box and at step 36 the system stores the mode data indicating the relationship between the first and second level dialog boxes for use when chaining the dialog boxes together. The process then terminates.

Figure 6:
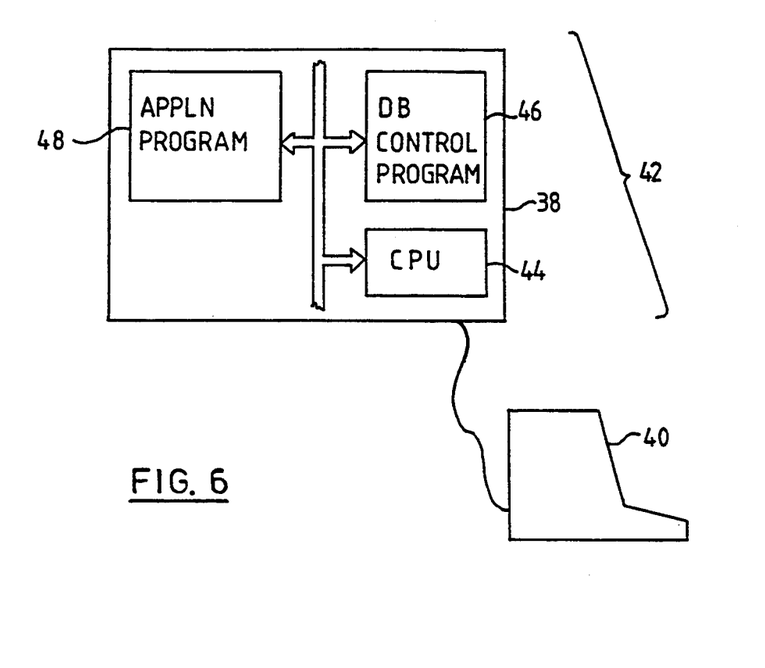
FIG. 6 is a schematic illustration of a data processing apparatus using the present invention.

FIG. 6 schematically illustrates a data processing apparatus 42 embodying the invention. The data processing apparatus 42 comprises a data processing unit 38 and a display 40. The data processing unit 38 includes a central processor unit 44, a dialog box control program storage area 46 and an application program storage area 48. The central processor unit 44 acting under control of the dialog box control program stored in dialog box control program storage 46 acts as logic for carrying out the functions with which the present invention is concerned. The central processor unit 44 acting under the control of the application program stored within the application program storage area 48 acts as logic to provide the data base application program described earlier.

It will be appreciated that while the present invention has been described in terms of a general purpose computer acting under the control of a computer program it would be possible (although in practice difficult and expensive) to embody the invention in special purpose hardware. Similarly, it will be appreciated that the invention is not restricted to the use of any particular computer language.

Figure 7:
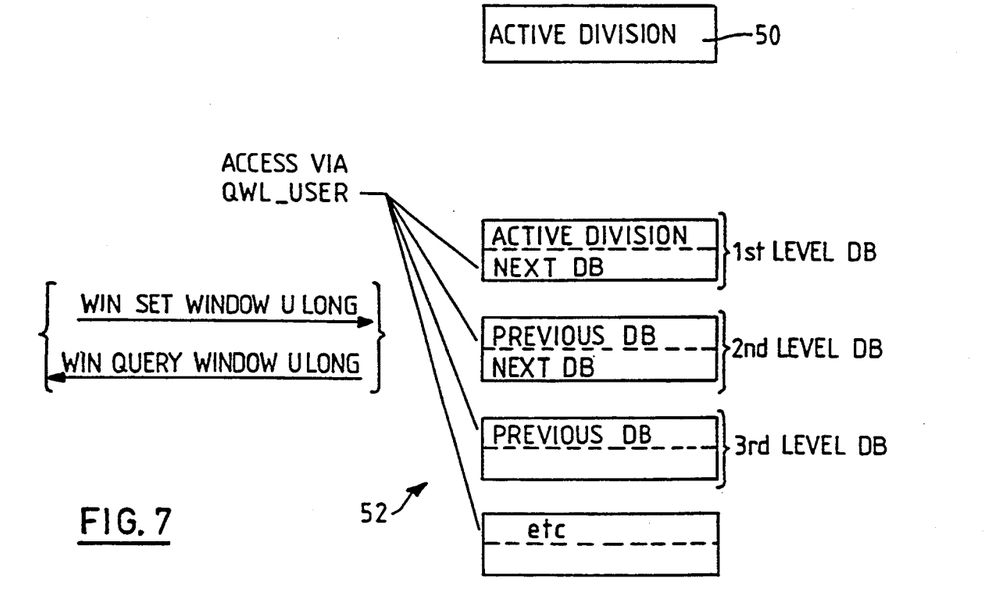
FIG. 7 is a schematic illustration of a data structure used in controlling the interaction of dialog boxes in one embodiment of the invention.

FIG. 7 illustrates a data structure that can be used within the Presentation Manager program discussed earlier to store the mode data indicating the connection between the various items within the logically defined division. Within the Presentation Manager environment the application system records data indicating what logically defined division of the program is currently active, i.e. stores the window handle of the currently active logical division. When focus is changed between logically defined divisions the application updates this store. This is illustrated as store 50. The Presentation Manager environment also provides a facility for use by dialog boxes and windows for storing pointers to data structures designated offset QWL_USER. The central processor unit 44 acting under the control of the dialog box control program may store data in and access data from these data structures using the WinSetWindowULong and WinQueryWindowULong commands within the Presentation Manager environment. The dialog boxes each store within this storage 52 data pointing to the previous item within the logical division chain and the following item within the logical division chain. In this way second and lower level dialog box point to the previous and next dialog box within the chain and the first level dialog box points to the route action menu 10 for that logically defined division and the next (second level) dialog box within the chain. It will be appreciated that the above is just one example of a storage structure that may be used to control the relationship between the various items within the logically defined division. While the invention has been particularly shown and described with reference to preferred embodiments thereof, it will be understood by those skilled in the art that various changes in form and details may be made therein without departing from the spirit and scope of the invention.

What is claimed is:

1. A method of manipulating data by performing a user selected action on said data within a dialog window stored by a data processing apparatus having a windowing user interface comprising the steps of:

detecting by said windowing user interface a first request by said user for manipulating data within a first logically defined division of an application program executing on said data processing apparatus, creating and displaying a first dialog window having a first mode data identifier in response to said first request for manipulating data by said user, storing said first mode data identifier for said first dialog window within a data structure for said first logically defined division in said data processing apparatus indicating said first dialog window is being displayed, and detecting by said windowing user interface a second request by said user for manipulating data within a second logically defined division of said application program executing on said data processing apparatus, creating a second mode data identifier for sad second logically defined division in response to said second request, and rejecting said second request when said first mode data identifier stored for said first logically defined division conflicts with said second mode data identifier by comparing said first mode data identifier with said second mode data identifier.

2. A method as claimed in claim 1, wherein said first mode data identifier of said first dialog window contains an identifier to said first logically defined division, said first logically defined division identifier being used for directing movement of a cursor by the data processing apparatus between said first dialog window and said first logically defined division.

3. A method as claimed in claim 2, wherein said first and second logically defined divisions contain an identifier to a main application action menu, said main application menu identifier being used for directing movement of a cursor between said first and second logically defined divisions and said main application action menu.

4. A method as claimed in claim 3, wherein said first and second logically defined divisions contain an identifier to a main application action menu, said main application menu identifier being used for directing movement of a cursor between said first and second logically defined divisions and said main application action menu.

5. A method as claimed in claim 3, wherein said movement of said cursor is affected by repeated operation of a predetermined key on a keyboard.

6. A method as claimed in claim 2 wherein said movement of said cursor is affected by repeated operation of a predetermined key on a keyboard.

7. A method as claimed in claim 2 wherein if said second request does not conflict with manipulating data in said first dialog window, then a second dialog window is created and displayed for said second logically defined division and a third request for manipulating data in a third logical defined division is detected by said data processing apparatus and a third mode data identifier is created and tested for conflict by comparing said third mode identifier with said second mode data identifier and said first mode data identifier.

8. A method as claimed in claim 2, wherein said first and second logically defined divisions contain an identifier to a main application action menu, said main application menu identifier being used for directing movement of a cursor between said first and second logically defined divisions and said main application action menu.

9. A method as claimed in claim 2, wherein said movement of said cursor is affected by repeated operation of a predetermined key on a keyboard.

10. A method as claimed in claim 1, wherein if said second request does not conflict with manipulating data in said first dialog window then a second dialog window is created and displayed for said second logically defined division and said second mode identifier is stored in said data structure indicating said second dialog window is displayed, and a third request for manipulating data in a third logically defined division is detected by said data processing apparatus and a third mode data identifier is created and tested for conflict by comparing said third mode identifier with said second mode data identifier and said first mode data identifier.

11. A method as claimed in claim 10, wherein said first and second mode data identifiers for said first and second dialog windows contain an identifier to each other, said first and second dialog window identifiers being used for directing movement of a cursor between dialog windows within said logically defined divisions.

12. A method as claimed in claim 11, wherein said first and second logically defined divisions contain an identifier to a main application action menu, said main application menu identifier being used for directing movement of a cursor between said first and second logically defined divisions and said main application action menu.

13. A method as claimed in claim 11, wherein said movement of said cursor is affected by repeated operation of a predetermined key on a keyboard.

14. A method as claimed in claim 11, wherein said first and second logically defined divisions contain an identifier to a main application action menu, said main application menu identifier being used for directing movement of a cursor between said first and second logically defined divisions and said main application action menu.

15. A method as claimed in claim 10, wherein said movement of said cursor is affected by repeated operation of a predetermined key on a keyboard.

16. A data processing apparatus having a display, a windowing user interface and dialog window control logic for:

detecting by said windowing user interface a user input from a user input device for manipulating data by performing user selected actions on said data in a dialog window displayed on the display for a first logically defined division of an application program executing on said data processing apparatus, creating and displaying a first dialog window having at least one mode data identifier containing information of the currently displayed first dialog windows for manipulating data within said first logically defined division, storing said mode data identifier in a data structure by said data processing apparatus for said first dialog window for said first logically defined division, and detecting by said windowing user interface a second request for manipulating data within a second logically defined division in said application program, creating a second mode data identifier for said second logically defined division in response to said second request, and rejecting said second request when said first mode data identifier stored for said first logically defined division and said second mode data identifier for said second request are compared and determined to be of a type conflicting with a previous user selected action in said first dialog window.

17. A data processing apparatus as claimed in claim 16, wherein said mode data identifier in said structure of said first dialog window contains an identifier to said first logically defined division, said first logically defined division identifier being used for directing movement of a cursor between said first dialog window and said first logically defined division.

18. A data processing apparatus as claimed in claim 17, wherein said first and second logically defined divisions contain an identifier to a main application action menu, said main application menu identifiers being used for directing movement of a cursor between said first and second logically defined divisions and main application action menu.

19. A data processing apparatus as claimed in claim 18, wherein said movement of said cursor is affected by repeated operation of a predetermined key on a keyboard.

20. A data processing apparatus as claimed in claim 17, wherein said movement of said cursor is affected by repeated operation of a key on a keyboard.

21. A data processing apparatus as claimed in claim 17, wherein if said second request does not conflict with manipulating data in said first dialog window then a second dialog window is created and displayed for said second logically defined division and a third request for manipulating data in a third logical defined division is detected by said data processing apparatus and a third mode data identifier is created and tested for conflict by comparing said third mode identifier with said second mode data identifier and said first mode data identifier.

22. A data processing apparatus as claimed in claim 16, wherein if said second request does not conflict with manipulating data in said first dialog window, then a second dialog window is created and displayed for said second logically defined division and a third request for manipulating data in a third logically defined division is detected by said data processing apparatus and a third mode data identifier is created and tested for conflict by comparing said third mode identifier with said second mode data identifier and said first mode data identifier.

23. A data processing apparatus as claimed in claim 22, wherein said first and second mode data identifiers for said first and second dialog windows contain an identifier to each other, said dialog window identifier being used for directing movement of a cursor between said first and second dialog windows within said first and second logically defined divisions.

24. A data processing apparatus as claimed in claim 23, wherein said first and second logically defined divisions contain an identifier to a main application action menu, said main application menu identifiers being used for directing movement of a cursor between said first and second logically defined divisions and main application action menu.

25. A data processing apparatus as claimed in claim 23, wherein said movement of said cursor is affected by repeated operation of a predetermined key on a keyboard.

26. A data processing apparatus as claimed in claim 22, wherein said movement of said cursor is affected by repeated operation of a predetermined key on a keyboard.

27. A data processing apparatus as claimed in claim 22, wherein said first and second logically defined divisions contain an identifier to a main application action menu, said main application menu identifiers being used for directing movement of a cursor between said first and second logically defined divisions and main application action menu.

* * * * *